UNITED STATES PATENT OFFICE.

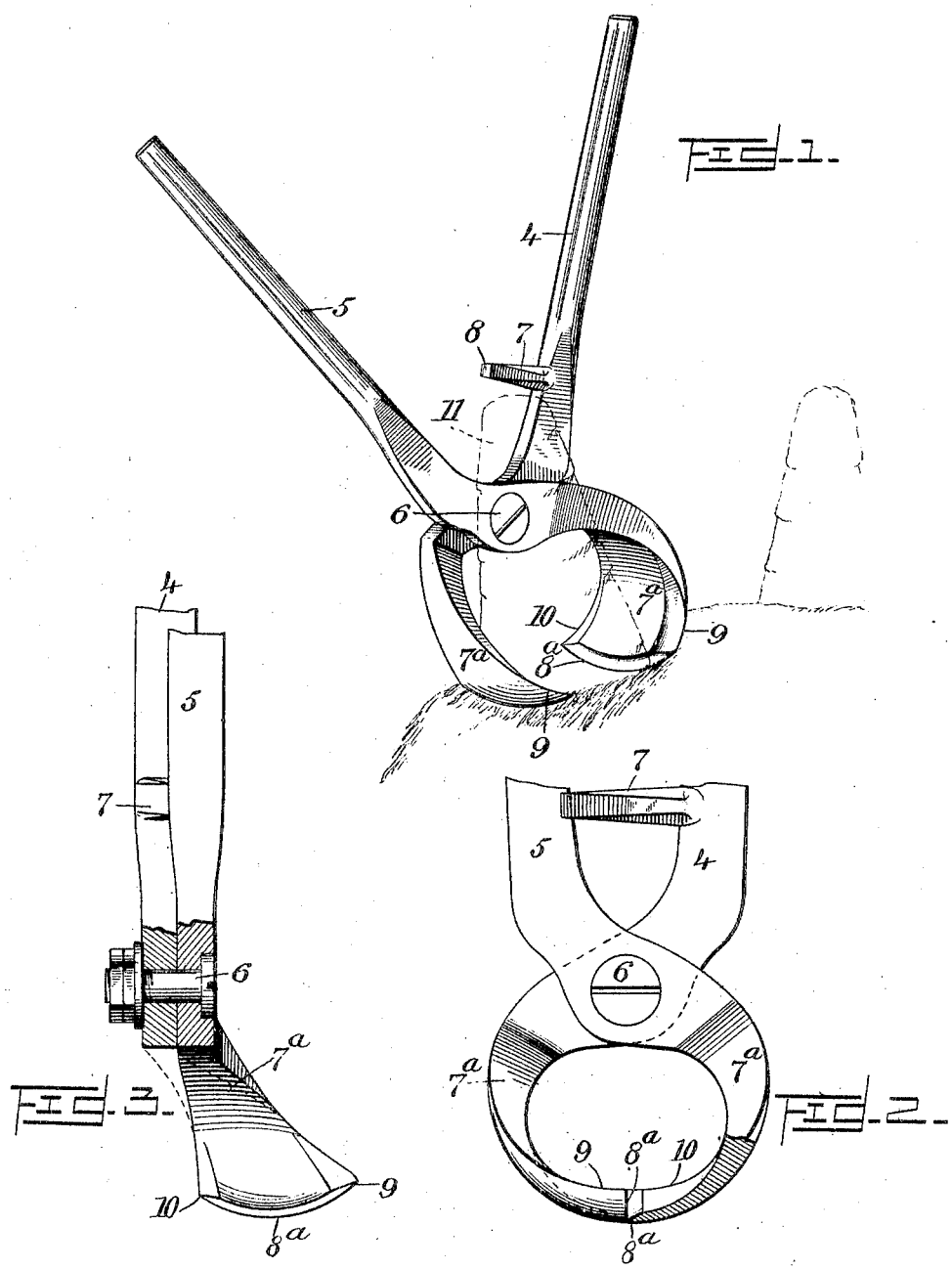

CHARLES ELIJAH BINNINGS, OF STAMFORD, TEXAS

DEHORNER FOR CATTLE.

No. 802,733. Specification of Letters Patent. Patented Oct. 24, 1905.

Application filed March 16, 1905. Serial No. 250,371

*To all whom it may concern:*

Be it known that I, CHARLES ELIJAH BINNINGS, a citizen of the United States, and a resident of Stamford, in the county of Jones and State of Texas, have invented a new and Improved Dehorner for Cattle, of which the following is a full, clear, and exact description.

My invention relates to instruments for dehorning cattle, and embraces certain constructional details hereinafter described, and pointed out in the appended claims.

My improved dehorner admits of general use, but is of special value in removing the embryo of partially-developed horns of exceedingly young cattle.

Reference is to be had to the accompanying drawings, forming a part of this specification, in which similar characters of reference indicate corresponding parts in all the figures.

Figure 1 is a perspective view showing the dehorner in use. Fig. 2 is a fragmentary plan view of the cutting-jaws of the dehorner, one of the edges being broken away for the sake of clearness; and Fig. 3 is a fragmentary section through the axis of the dehorner and showing certain edges more in detail.

The handles are shown at 4 5 and are movably connected together by a pivot-pin 6. The handle 5 is provided with a boss 7, having a concave end 8, which fits against the convex handle 5, as will be understood from Figs. 1 and 2. The concavity of the end 8 mating the convexity of the handle 5 operates as a sort of guide, so that the handles 4 5 and all parts rigidly connected thereto are held in a predetermined relation the instant the cut is made.

Mounted upon the handles 4 5 and integral therewith are jaws $7^a$, provided, respectively, with cutting edges $8^a$, mating each other, and also with cutting edges 9 10, these last-mentioned cutting edges being at a right angle to the cutting edges $8^a$. Referring to the drawings, and more particularly to Figs. 1 and 3, it will be seen that the cutting edges $8^a$ are of arcuate shape and that the extreme lower end of the dehorner when ready for use is rotund in form, so as to sever the horns while making the smallest possible wound. It will also be seen that as the jaws $7^a$ are bent laterally in the same direction the pivot-pin 6, or, in other words, the axis of the dehorner, is displaced in a lateral direction from the axis of the horn 11, so that the latter projects outwardly to a point beyond the axis. In this way the cutting edges of the dehorner may be placed snugly around the base of the horn and the dehorner as a whole may be readily turned, the length of the horn within certain reasonable limits being immaterial.

My invention is used as follows: The operator grasps the handles 4 5 and forces the cutting edges $8^a$ around the base of the horn, so as to force back the skin encircling the horn, and then pressing the handles 4 5 together he turns them so as to make the edges $8^a$ cut with a shearing motion around the base of the horn. In other words, he twists the handles while pressing them together, so as to cut the horn all around. In doing this the cutting edges 9 10, which are disposed at an angle to the cutting edges $8^a$, necessarily clear away any skin or other obstruction which may interfere with the cutting of the horns. The convexity of the cutting edges $8^a$ causes them to go underneath the horns if the latter be but a few weeks old, thus removing the so-called "button," which is the embryo of the horn. The button being removed, it is impossible for a horn to grow out afterward.

As a general proposition my invention is used for dehorning cattle from two to eight weeks of age, though its use may well be extended to cattle of the age from six to eight months.

Having thus described my invention, I claim as new and desire to secure by Letters Patent—

1. A dehorner, comprising a pair of handles provided with jaws having cutting edges, and a single pivot connecting said handles together, said jaws being bent laterally out of alinement with said pivot so as to allow the horn, when being cut, to project beyond said single pivot.

2. A dehorner, comprising a pair of handles provided with jaws having cutting edges, a single pivot connecting said handles together, said jaws being bent laterally out of alinement with said pivot so as to allow a horn, when being cut, to project beyond said pivot, and a limiting-stop for preventing said cutting edges from destroying each other.

3. In a dehorner, the combination of a pair of jaws provided with oppositely-disposed cutting edges mating each other, means for moving said jaws so as to cause said cutting edges to approach and recede from each other, said jaws being provided with other cutting edges disposed at an angle to said first-mentioned cutting edges.

4. In a dehorner, the combination of a pair of jaws provided with oppositely-disposed cutting edges adapted to approach and recede from each other, and further provided with oppositely-disposed cutting edges disposed at an angle to said first-mentioned cutting edges, a pivot upon which said jaws are mounted, said pivot being out of alinement with all of said cutting edges so as to enable said jaws to engage a horn of comparatively great length, and means for actuating said jaws.

In testimony whereof I have signed my name to this specification in the presence of two subscribing witnesses.

CHARLES ELIJAH BINNINGS.

Witnesses:
WALTER L. ORT,
J. C. BRYANT.